United States Patent
Russell

(10) Patent No.: US 7,743,126 B2
(45) Date of Patent: Jun. 22, 2010

(54) MIGRATING RECOVERY MODULES IN A DISTRIBUTED COMPUTING ENVIRONMENT

(75) Inventor: Lance W. Russell, Hollister, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1480 days.

(21) Appl. No.: 09/895,235

(22) Filed: Jun. 28, 2001

(65) Prior Publication Data

US 2003/0005102 A1 Jan. 2, 2003

(51) Int. Cl.
G06F 15/173 (2006.01)
(52) U.S. Cl. ................................... 709/223
(58) Field of Classification Search ............... 709/223, 709/224, 226; 714/4, 11; 379/9, 10, 230, 379/229
See application file for complete search history.

(56) References Cited

U.S. PATENT DOCUMENTS

| | | | |
|---|---|---|---|
| 4,710,926 A | 12/1987 | Brown et al. | |
| 5,151,987 A | 9/1992 | Abraham et al. | |
| 5,390,326 A | 2/1995 | Shah | |
| 5,440,726 A | 8/1995 | Fuchs et al. | |
| 5,651,006 A * | 7/1997 | Fujino et al. | 370/408 |
| 5,655,081 A | 8/1997 | Bonnell et al. | |
| 5,710,885 A * | 1/1998 | Bondi | 709/224 |
| 5,751,964 A * | 5/1998 | Ordanic et al. | 709/224 |
| 5,802,267 A | 9/1998 | Shirakihara et al. | |
| 5,805,785 A | 9/1998 | Dias et al. | |
| 5,872,931 A * | 2/1999 | Chivaluri | 709/223 |
| 5,923,833 A | 7/1999 | Freund et al. | |
| 5,944,783 A | 8/1999 | Nieten | |
| 6,012,152 A * | 1/2000 | Douik et al. | 714/26 |
| 6,026,499 A | 2/2000 | Shirakihara et al. | |
| 6,038,212 A | 3/2000 | Galand et al. | |
| 6,055,562 A | 4/2000 | Devarakonda et al. | |
| 6,072,857 A * | 6/2000 | Venkateshwaran et al. | 379/9 |
| 6,092,096 A | 7/2000 | Lewis | |
| 6,105,148 A | 8/2000 | Chung et al. | |
| 6,115,736 A | 9/2000 | Devarakonda et al. | |
| 6,173,311 B1 | 1/2001 | Hassett et al. | |
| 6,226,666 B1 | 5/2001 | Chang et al. | |
| 6,430,698 B1 * | 8/2002 | Khalil et al. | 714/4 |
| 6,460,070 B1 * | 10/2002 | Turek et al. | 709/202 |
| 6,529,515 B1 * | 3/2003 | Raz et al. | 370/401 |
| 6,681,243 B1 * | 1/2004 | Putzolu et al. | 709/202 |
| 6,728,896 B1 * | 4/2004 | Forbes et al. | 714/4 |
| 6,731,832 B2 * | 5/2004 | Alvarez et al. | 385/16 |
| 6,834,302 B1 * | 12/2004 | Harvell | 709/224 |
| 2002/0049845 A1 * | 4/2002 | Sreenivasan et al. | 709/226 |

OTHER PUBLICATIONS

Gianni Di Caro et al., "An adaptive multi-agent routing algorithm inspired by ants behavior," Proceedings of PART98—5th Annual Australian Conference on Parallel and Real-Time Systems, Springer-Verlag, pp. 261-272 (1998).

* cited by examiner

Primary Examiner—Tonia L Dollinger
Assistant Examiner—Asghar Bilgrami

(57) ABSTRACT

Systems and methods for implementing recovery processes on failed nodes in a distributed computing environment are described. In accordance with this scheme, one or more migratory recovery modules are launched into the network. The recovery modules migrate from node to node, determine the status of each node, and initiate recovery processes on failed nodes. In this way, scalable recovery processes may be implemented in distributed systems, even with incomplete network topology and membership information. In addition, the complexity and cost associated with manual status monitoring and recovery operations may be avoided.

26 Claims, 3 Drawing Sheets

MIGRATING RECOVERY MODULES IN A DISTRIBUTED COMPUTING ENVIRONMENT

TECHNICAL FIELD

This invention relates to systems and methods for managing nodes and implementing recovery processes in a distributed computing environment.

BACKGROUND

In modern computer systems, computers may communicate with each other and with other computing equipment over various types of data networks. Routable data networks are configured to route data packets (or frames) from a source network node to one or more destination network nodes. As used herein, the term "routable protocol" refers to a communications protocol that contains a network address as well as a device address, allowing data to be routed from one network to another. Examples of routable protocols are SNA, OSI, TCP/IP, XNS, IPX, AppleTalk, and DECnet. A "routable network" is a network in which communications are conducted in accordance with a routable protocol. One example of a routable network is the Internet, in which data packets are routed in accordance with the Internet Protocol (IP). In a routable data network, when a network routing device (or router) receives a data packet, the device examines the data packet in order to determine how the data packet should be forwarded. Similar forwarding decisions are made as necessary at one or more intermediate routing devices until the data packet reaches a desired destination node.

Network routers typically maintain routing tables that specify network node addresses for routing data packets from a source network node to a destination network node. When a data packet arrives at a router, an address contained within the packet is used to retrieve an entry from the routing table that indicates the next hop (or next node) along a desired route to the destination node. The router then forwards the data packet to the indicated next hop node. The process is repeated at successive router nodes until the packet arrives at the desired destination node. A data packet may take any available path to the destination network node. In accordance with IP, data packets are routed based upon a destination address contained in the data packet. The data packet may contain the address of the source of the data packet, but usually does not contain the address of the devices in the path from the source to the destination. These addresses typically are determined by each routing device in the path based upon the destination address and the available paths listed in the routing tables.

Distributed computer systems typically include a number of recovery functions that increase the reliability of process execution. For example, various checkpointing and restoration (or rollback) techniques have been developed for recovering from hardware and software failures. In accordance with these techniques, the information that is needed to re-execute a process in a given state is stored at a number of checkpoints during the operation of the process. If the execution of the process is interrupted (e.g., the process has failed or is hung), the state of the interrupted process is rolled back to the checkpoint state immediately preceding the interruption, and the process is re-executed from that checkpoint state.

Various heartbeat fault detection schemes also have been developed. In relatively small network environment in which the topology and membership information is known, such heartbeat-based fault detection schemes typically involve heartbeat monitors that are installed at each node of the distributed system to probe the health of each associated node. In general, heartbeat monitors require constant monitoring of all nodes of the system. A heartbeat monitor may probe the health of an associated node process by, for example, detecting if the node process has failed, monitoring the node log file for any indication of process failure, exchanging messages with the node process, or making calls to the node system manager to determine if the system is operating properly. If a heartbeat monitor detects that a particular node process has failed, it may attempt to restart the process or notify a network management system (or console) of the failure, or both.

Still other network recovery schemes have been proposed.

SUMMARY

The invention features a novel scheme (systems and methods) for implementing recovery processes on failed nodes in a distributed computing environment. In accordance with this inventive scheme, one or more migratory recovery modules are launched into the network. The recovery modules migrate from node to node, determine the status of each node, and initiate recovery processes on failed nodes. In this way, the invention allows scalable recovery processes to be implemented in distributed systems, even with incomplete network topology and membership information. By periodically monitoring each of the network nodes—as opposed to continuously monitoring each node—the invention easily may be scaled to large networks. In addition, the invention avoids the complexity and cost associated with manual status monitoring and recovery operations.

In one aspect of the invention a recovery module is configured to migrate from one network node to another, determine a status of a network node, and initiate a recovery process on a failed network node.

Embodiments in accordance with this aspect of the invention may include one or more of the following features.

The recovery module may comprise a routing component for determining a next hop address from an origin network node to a destination network node. The routing component may be configured to determine the next hop address based upon a routing table that is stored at the origin network node.

The recovery module may be configured to determine the status of a network node by sending an inter-process communication to a node process. The recovery module may be configured to determine the status of a network node in accordance with a heartbeat messaging protocol. The recovery module also may be programmed to use standard operating facilities (e.g., the Unix "ps" command) to determine the status of a network node process.

The recovery module may be configured to initiate a recovery process on a failed network node in accordance with a restart protocol. The recovery module may be configured to initiate a restart of a failed node process by transmitting a request to a process execution service operating on the failed network node.

The recovery module preferably is configured to transmit a node status message to a network management module operating at a network management network node. The node status message may comprise information that is obtained from a log file generated at the failed network node.

A network management module may be configured to launch a plurality of recovery modules into the network.

The invention also features a method and a computer program for managing a plurality of distributed nodes of a network.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
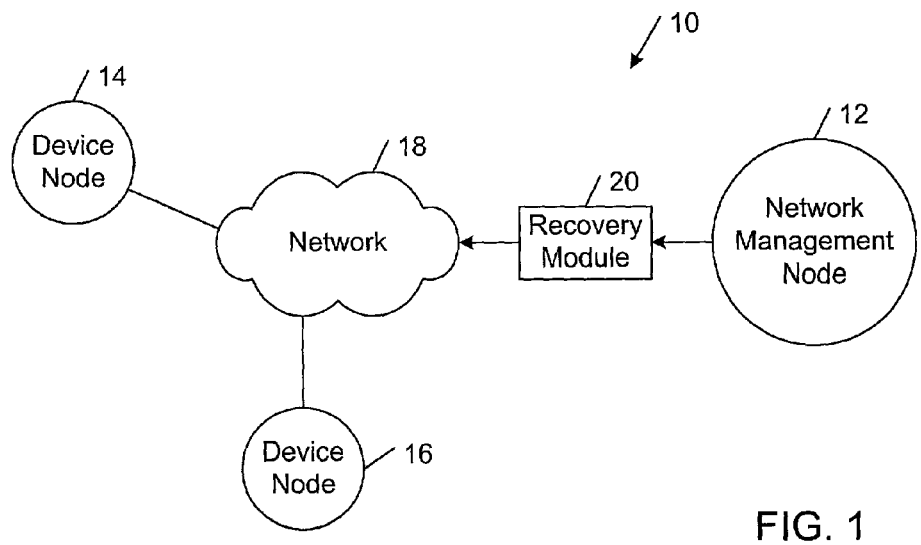
FIG. 1 is a diagrammatic view of a communication network interconnecting a plurality of distributed nodes, including a network management node and two device nodes.

Referring to FIG. 1, in one embodiment, a distributed computing system 10 includes a plurality of distributed nodes, including a network management node 12 and two device nodes 14, 16, that are interconnected by a network 18. Communications over distributed computing system 10 are conducted in accordance with a routable communications protocol (e.g., TCP/IP, SNA, OSI, XNS, IPX, AppleTalk, and DECnet). Network 18 may be implemented as a local area network (LAN), a wide area network (WAN), or other routable network (e.g., the Internet). As explained in detail below, network management node 12 is configured to implement recovery processes on failed nodes by launching one or more migratory recovery modules 20 into distributed computing system 10. Network management node 12 also is configured to monitor the number of failures reported by recovery modules 20. As the number of reported failures increases, network management node 12 may launch more recovery modules 20 into distributed computing system 10. Not all network nodes are monitored continuously below the level of monitoring increases as the probability of failure increases. The recovery modules 20 migrate from node to node, determine the status of each node, and initiate recovery processes on failed nodes. In accordance with this approach, scalable recovery processes may be implemented in distributed computing system 10, even with incomplete network topology and membership information. In addition, the complexity and cost associated with manual status and recovery operations may be avoided.

Figure 2:
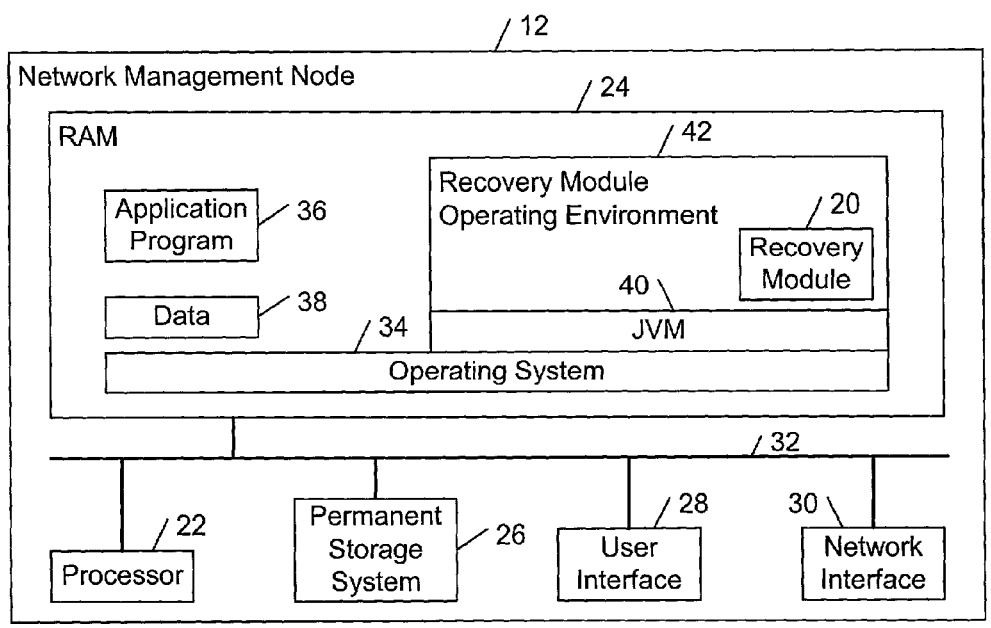
FIG. 2 is a diagrammatic view of components of the network management node of FIG. 1.

Referring to FIG. 2, in one embodiment, network management node 12 may be implemented as a computer (or server) that include a processor 22, a random access memory (RAM) 24, a permanent storage system 26, a user interface 28, a network interface 30, and a system bus 32 that couples the various components of network management node 12. Processor 22 may include one or more processors, each of which may be in the form of any one of various commercially available processors. Permanent storage system 26 may be implemented as a hard drive, a floppy drive, a CD ROM drive, or a combination of one or more of such storage drives. These storage drives may connect to system bus 32 through respective interfaces and may contain respective computer-readable media disks that provide non-volatile or persistent storage for data, data structures and computer-executable instructions. Permanent storage system 26 may contain a read only memory (ROM) that stores a basic input/output system (BIOS) containing start-up routines for network management node 12. System bus 32 may be a memory bus, a peripheral bus or a local bus, and may be compatible with any of a variety of bus protocols, including PCI, VESA, Microchannel, ISA, and EISA. Other computer-readable storage devices (e.g., magnetic tape drives, flash memory devices, and digital video disks) also may be used with network management node 12. A user may interact (e.g., enter commands or data) with network management node 12 through user interface 28, which may include a keyboard and a mouse. Other input devices (e.g., a microphone, joystick, or touch pad) also may be provided. User interface 28 also may include a monitor for displaying information to the user. Network management node 12 also may include peripheral output devices, such as speakers and a printer (not shown).

A number of program modules may be stored in permanent storage system 26 and in RAM 24, including an operating system 34 (e.g., the Windows NT Server operating system available from Microsoft Corporation of Redmond, Wash. U.S.A.), one or more application programs 36, and program data 38. Operating system 34 includes an executive that provides the base operating system services (e.g., memory management, process and thread management, security, input/output, and interprocess communication) for creating a run-time execution environment on network management node 12 and, in some embodiments, on device nodes 14, 16. A configuration database (or registry) contains the following information: parameters needed to boot and configure the system; system-wide software settings that control the operation of operating system 60; a security database; and per-user profile settings. A native operating system (OS) application programming interface (API) exposes the base operating system services of the executive to user applications and to one or more service modules (or simply "services"). As used herein, the term "service" (or "service module") refers to a component of an operating system that provides a set of one or more functions. The service modules are user-mode processes that may be configured to start automatically at system boot time without requiring an interactive logon; they also may be controlled dynamically during run-time. The service modules call certain base operating system services (or functions) to interact with a service controller; such functions may include registering a successful startup, responding to status requests, and pausing or shutting down the service. The service controller starts, manages and directs operations within the service modules. The service modules, on the other hand, create the environment in which one or more processes may operate and control the start-up, maintenance and termination of such processes. Typically, the run-time execution environment is installed on network management node 12, and one or more client programs operating on device nodes 14, 16 may access the functionality provided by the service modules over their respective network connections. Before a service module may operate in the run-time execution environment, it must be installed on network management node 12. A service module typically is installed by storing the service module in a data storage area that is accessible by network management node 12 (e.g., on a disk of permanent storage system 26), and registering the attributes of the service module in the configuration database. Further details about the Windows NT operating system may be obtained from "Inside Windows NT,"

Second Edition, David A. Solomon, Microsoft Press (1998), which is incorporated herein by reference.

As shown in FIG. 2, a JAVA virtual machine (JVM) 40, which provides a platform for executing an operating environment 42 for the migratory recovery modules 20, also may be stored in permanent storage system 26 and in RAM 24. In the 32-bit Windows environment, for an application (or another DLL) to call the system service functions of the Win 32 API, the application must conform to a standard C-based interface. Accordingly, most service components operating in a 32-bit Windows environment are written in the C or C++ programming languages. In order to invoke the functionality of service components written in other programming languages, each component must provide its own customized operating environment in which the component may operate. For example, programs written in the JAVA programming language must operate in an environment provided by JVM 40. The JVM is an abstract native computing machine that runs within an operating system to interpret and execute JAVA applications. Further details about JVM 40 may be obtained from "The Java™ Virtual machine Specification," Tim Lindholm and Frank Yellin, Addison Wesley (1997), which is incorporated herein by reference.

Recovery modules 20 are software components that are capable of migrating from one network node to another and executing on each network node. In one embodiment, recovery modules 20 are implemented as JAVA objects that are instantiated by recovery module operating environment 42. Each node in distributed computing system 10 may include a recovery module operating environment 42 that executes on a JVM and provides recovery modules 20 access to certain status monitoring, recovery resources and native operating system resources that are available at each network node. Recovery modules 20 may access node resources indirectly through services (e.g., JAVA classes that may be instantiated as objects containing methods for accessing node resources) or they may access node resources directly.

Figure 3:
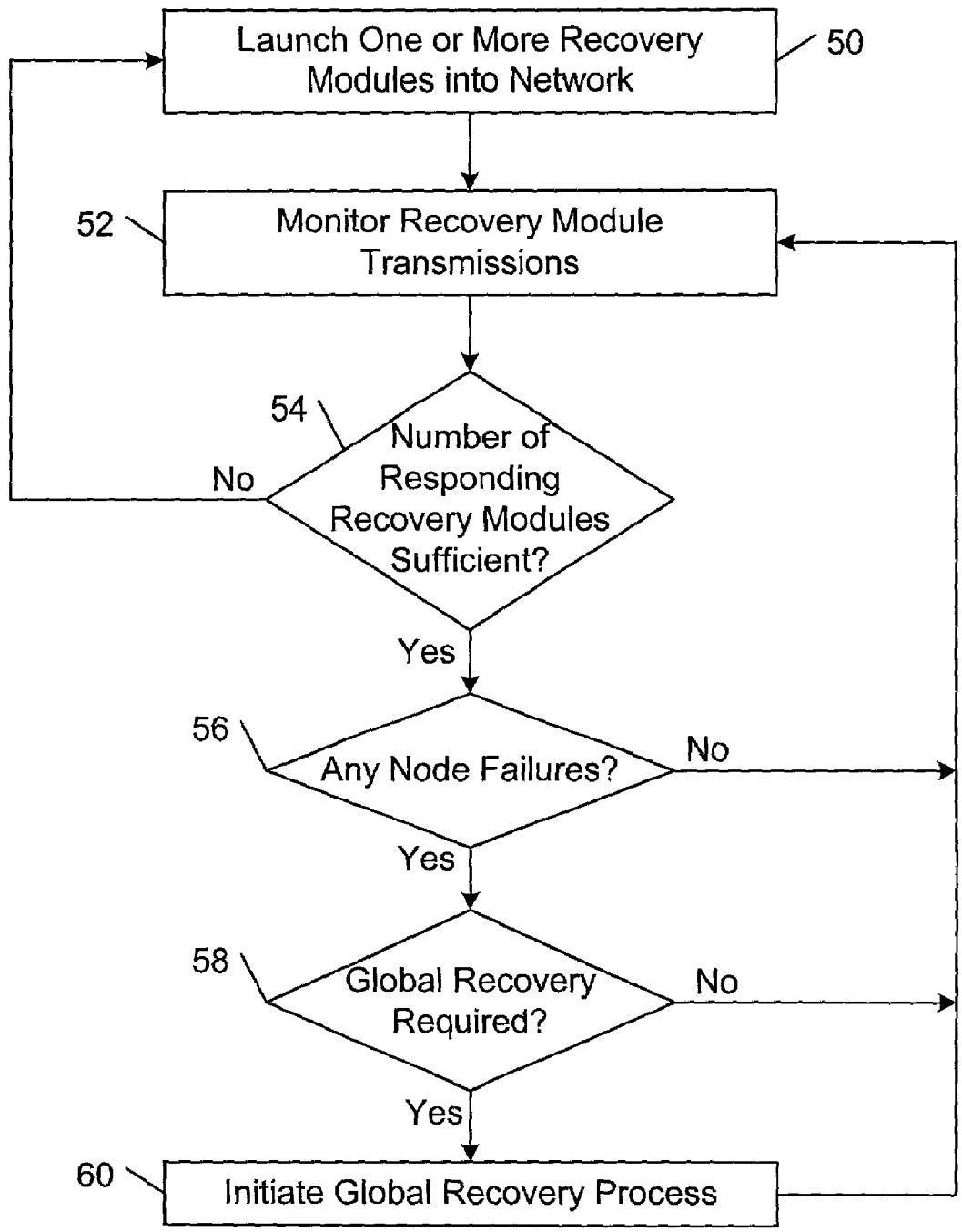
FIG. 3 is a flow diagram of a method of managing the nodes of the network of FIG. 1.

Referring to FIG. 3, in one embodiment, a network management module operating at network management node 12 may monitor the status and implement recovery processes on one or more nodes of distributed computing system 10, as follows. The network management module launches one or more recovery modules 20 into distributed computing system 10 (step 50). The network management module transmits the recovery modules 20 to one or more target network nodes by transmitting the code and data for each recovery module 20 in the form of a JAVA class file. Typically, the number and identity of the target network nodes are identified statistically so that the reliability of the system is statistically monitored at a specified confidence level. The target node addresses may be obtained from a routing table that is stored at network management node 12. The number of recovery modules 20 that are launched into distributed computing system 10 may be determined statistically based upon a desired service level (or policy). The network management module monitors transmissions that are received from the recovery modules 20 that were launched into distributed computing system 10 (step 52). Communications between the network management module and the recovery modules 20 may be in accordance with a simple network management protocol (SNMP). If the number of reporting recovery modules 20 is sufficient to satisfy the desired service level (step 54), the network management module continues to monitor recovery module transmissions until a network node failure is reported (step 56); otherwise, the network management module launches additional recovery modules 20 into distributed computing system 10 to satisfy the desired service level (step 50). If a network node failure is reported (step 56), the network management module determines whether a global network recovery process should be implemented (step 58). Typically, local recovery procedures initiated by recovery modules 20 are sufficient to correct for node failures and a global recovery process is not required. If a global network recovery process is not required (step 58), the network management module continues monitoring recovery module transmissions (step 52). If a global network recovery process is required (step 58), the network management module initiates a global recovery process (step 60). The global recovery process may be a conventional checkpointing and rollback recovery process.

Figure 4:
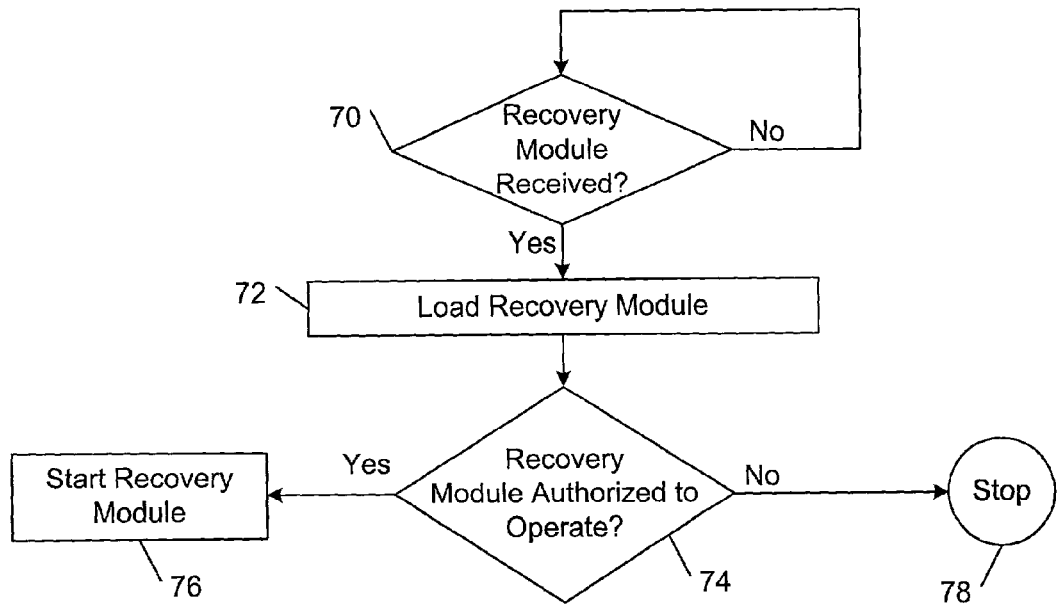
FIG. 4 is a flow diagram of a method of handling the receipt of a migratory recovery module at a network node.

Referring to FIG. 4, in one embodiment, upon receipt of a recovery module 20 (step 70), a recovery module operating environment 42 executing at a receiving network node loads the recovery module 20 (step 72). The recovery module operating environment 42 may use JAVA methods to load the recovery module 20 based upon the received recovery module JAVA class file. JAVA methods also may be used to instantiate a recovery module object based upon the received recovery module data. If the recovery module is authorized to operate at the receiving network node (step 74), the recovery module operating environment 42 starts the recovery module object (step 76); otherwise, the recovery module operating environment 42 unloads the received recovery module 20 (step 78).

Figure 5:
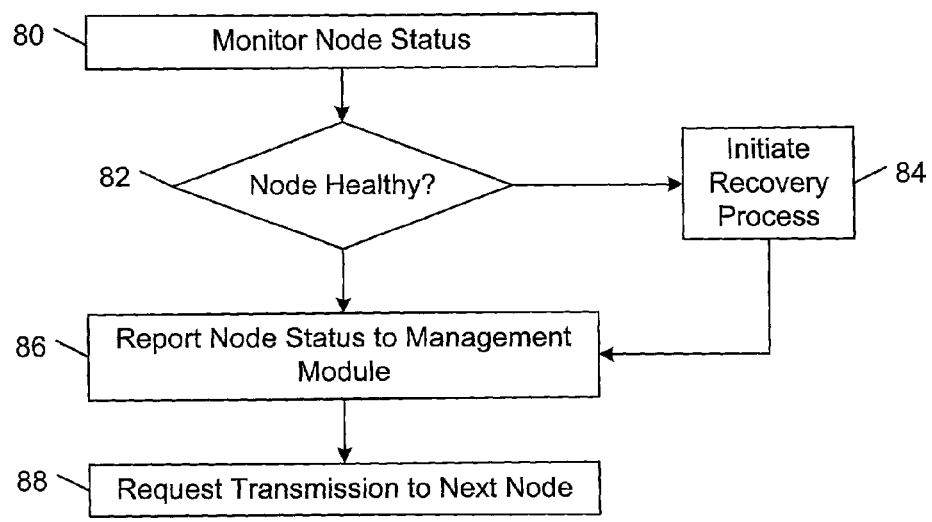
FIG. 5 is a flow diagram of a method by which a migratory recovery module may determine the status of a network node and initiate a recovery process on a failed network node.

As shown in FIG. 5, in one embodiment, during execution on a network node, a migratory recovery module 20 may monitor the status and initiate recovery processes (if necessary), as follows. Initially, recovery module 20 monitors the health of the network node (step 80). Recovery module 20 may probe the health of an associated node process by accessing one or more node monitoring resources of the network node in accordance with a conventional heartbeat messaging protocol. Recovery module 20 may detect if the node process has failed, monitor the node log file for any indication of process failure, exchange heartbeat messages with the node process, or make calls to the node system manager to determine if the system is operating properly. If recovery module 20 determines that one or more node processes have failed (step 82), recovery module 20 may initiate a recovery process in accordance with a conventional restart protocol (step 84). For example, recovery module 20 may attempt to restart the failed process by transmitting a request to a process execution service operating on the failed network node. The status of the node, including information relating to any failed node processes (e.g., any logged checkpointing information or other information dumps), is reported to the network management module (step 86). The node status report may be transmitted in accordance with SNMP. Recovery module 20 then may request to be transmitted to the next destination network node (step 88). Recovery module 20 may make the transmission request by invoking a recovery module migration method. The migration method may call a corresponding migration method of recovery module operating environment that halts operation of the recovery module 20 and transmits the recovery module code and data to a specified destination node. Recovery module 20 may include a routing method that may be invoked to identify the destination node address based upon a routing table stored at the network node. The destination node may be selected randomly or in accordance with a prescribed routing policy.

Although systems and methods have been described herein in connection with a particular distributed computing environment, these systems and methods are not limited to any particular hardware or software configuration, but rather they may be implemented in any computing or processing environment, including in digital electronic circuitry or in computer hardware, firmware or software. In general, the component systems of the network nodes may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A system for managing a plurality of distributed nodes of a network, comprising: a memory storing computer-readable instructions; and a processor coupled to the memory, operable to execute the instructions, and based at least in part on the execution of the instructions operable to perform operations comprising executing a network management module that causes the processor to launch migratory recovery modules into the network to monitor status of each of the network nodes; wherein each of the recovery modules is configured to: cause any given one of the network nodes to migrate the recovery module from the given network node to another one of the network nodes; cause any given one of the network nodes to determine a respective status of the given network node; and cause any given one of the network nodes to initiate a recovery process on the given network node in response to a determination that the given network node has one or more failed node processes wherein, in the executing, the network management module causes the processor to perform operations comprising, launching the recovery modules in order to determine the status of each of the network nodes, monitoring transmissions that are received from the recovery modules executing on respective ones of the network nodes in order to provide periodic monitoring of the status of each of the network nodes, and statistically identifying target ones of the network nodes that are needed to achieve a specified confidence level of network monitoring reliability, and launching the recovery modules into the network by transmitting respective ones of the recovery modules to the identified target network nodes.

2. The system of claim 1, wherein at least one of the recovery modules comprises a respective routing component that is executable by a given one of the network nodes to cause the given network node determine next hop addresses for migrating the recovery module from the given network node to a series of successive destination network nodes.

3. The system of claim 2, wherein the routing component is executable by the given network node to cause the given network node to determine the next hop addresses based upon a routing table stored at the given network node.

4. The system of claim 1, wherein at least one of the recovery modules is executable by a given one of the network nodes to cause the given network node to determine the status of the given network node by sending an inter-process communication to a node process executing on the given network node.

5. A The system of claim 1, wherein each of the recovery modules is configured to cause any given one of the network nodes to determine the status of the given network node in accordance with a heartbeat messaging protocol.

6. The system of claim 1, wherein each of the recovery modules is executable by a given one of the network nodes to cause the given network node to perform operations comprising:

determining whether the given network node has one or more failed processes; and in response to a determination that the given network node has a failed process, initiating a recovery process on the given network node in accordance with a restart protocol.

7. The system of claim 6, wherein each of the recovery modules is executable by the given network node to cause to given network node to respond to a determination that the given network node has a failed process by initiating a restart of the failed process by transmitting a request to a process execution service operating on the given network node.

8. The system of claim 1, wherein each of the recovery modules is executable by a given one of the network nodes to cause the given network node to transmit a respective node status message to the network management module.

9. The system of claim 8, wherein each of the node status messages comprises information obtained from a respective log file generated at a respective one of the network nodes having one or more failed node processes.

10. A method for managing a plurality of distributed nodes of a network, comprising: (a) on a current one of the network nodes, determining a status of the current network node; (b) in response to a determination that the current network node has one or more failed node processes, initiating a recovery process on the current network node; (c) after initiating the recovery process, migrating from the current network node to a successive one of the network nodes; (d) repeating (a), (b), and (c) with the current network node corresponding to the successive network node for each of the nodes in the network; and (e) on a respective one of the network nodes: determining a number of the recovery modules needed to achieve a specified network monitoring service level; statistically identifying target ones of the network nodes to achieve a specified confidence level of network monitoring reliability; and transmitting the determined number of the recovery modules to the identified target network nodes.

11. The method of claim 10, wherein migrating from one network node to another comprises determining a next hop address from an origin network node to a destination network node.

12. The method of claim 11, wherein the next hop address is determined based upon a routing table stored at the origin network node.

13. The method of claim 10, wherein the status of a network node is determined by sending an inter-process communication to a node process.

14. The method of claim 10, wherein the status of a network node is determined in accordance with a heartbeat messaging protocol.

15. The method of claim 10, wherein a recovery process is initiated on a network node having one or more failed node processes in accordance with a restart protocol.

16. The method of claim 15, wherein a restart of a failed node process is initiated by transmitting a request to a process execution service operating on the failed network node.

17. The method of claim 10, further comprising transmitting a node status message to a network management module operating at a network management network node.

18. The method of claim 10, further comprising launching a plurality of recovery modules from a respective one of the network nodes into the network, wherein each of the recovery modules is configured to: migrate from one recipient one of the network nodes to another; cause each of the recipient network nodes to determine the status of itself; and cause each of the recipient network nodes having one or more failed node processes to initiate a recovery process on itself.

19. A computer-readable persistent storage medium comprising computer code for managing a plurality of distributed nodes of a network, the computer code comprising computer-readable instructions that, when executed by respective processors, cause the respective processors to implement a management module and recovery modules; wherein the management module is operable to cause at least one of the processors to perform operations comprising statistically identifying target ones of the network nodes that are needed to achieve a specified confidence level of network monitoring reliability, and launching the recovery modules into the network by transmitting respective ones of the recovery modules to the identified target network nodes; wherein each of the recovery modules is operable cause at least one of the processors to perform operations comprising migrating the recovery module from one network node to a series of successive network nodes, determining a status of a current one of the network nodes to which the recovery module has migrated,; in response to a determination that the current network has one or more failed node processes, initiating a recovery process on the current network node; and after initiating the recovery process on the current network node, migrating from the current network node to a successive one of the network nodes.

20. The system of claim 1, wherein each of the recovery modules is a software object that is instantiatable by a respective operating environment on each of the network nodes.

21. The computer-readable persistent storage medium of claim 20, wherein the operating environment on each of the network nodes provides each of the recovery modules with access to status monitoring resources, recovery resources, and native operative system resources that are available at each of the network nodes.

22. The system of claim 1, wherein, upon migrating from a first one of the network nodes to a second one of the network nodes and being instantiated on the second network node, a given one of the recovery modules causes the second network node to determine a status of the second network node.

23. The system of claim 22, wherein the given recovery module causes the second network node to initiate a recovery process on the second network node in response to a determination that the second network node has one or more failed node processes.

24. The system of claim 22, wherein the given recovery module is configured to cause the second network node to migrate the given recovery module to a third one of the network nodes after determining the status of the second network node.

25. The system of claim 1, wherein the network management module causes the processor to determine a number of the recovery modules needed to achieve a specified network monitoring service level, and to launch the determined number of recovery modules into the network to achieve the specified network monitoring service level.

26. The system of claim 1, wherein, in the executing, the network management module causes the processor to monitor number of network node failures reported by the recovery modules and causes the processor to launch more of the migratory recovery modules into the network as the number of reported failures increases.

* * * * *

UNITED STATES PATENT AND TRADEMARK OFFICE
CERTIFICATE OF CORRECTION

| | | |
|---|---|---|
| PATENT NO. | : 7,743,126 B2 | Page 1 of 1 |
| APPLICATION NO. | : 09/895235 | |
| DATED | : June 22, 2010 | |
| INVENTOR(S) | : Lance W. Russell | |

It is certified that error appears in the above-identified patent and that said Letters Patent is hereby corrected as shown below:

In column 9, line 38, in Claim 19, delete "migrated,;" and insert -- migrated; --, therefor.

Signed and Sealed this

Fifth Day of October, 2010

David J. Kappos
*Director of the United States Patent and Trademark Office*